Dec. 18, 1956  W. J. A'BECKETT  2,774,538
APPARATUS FOR MIXING LIQUIDS OF DIFFERENT TEMPERATURES
Filed Sept. 9, 1955  2 Sheets-Sheet 1
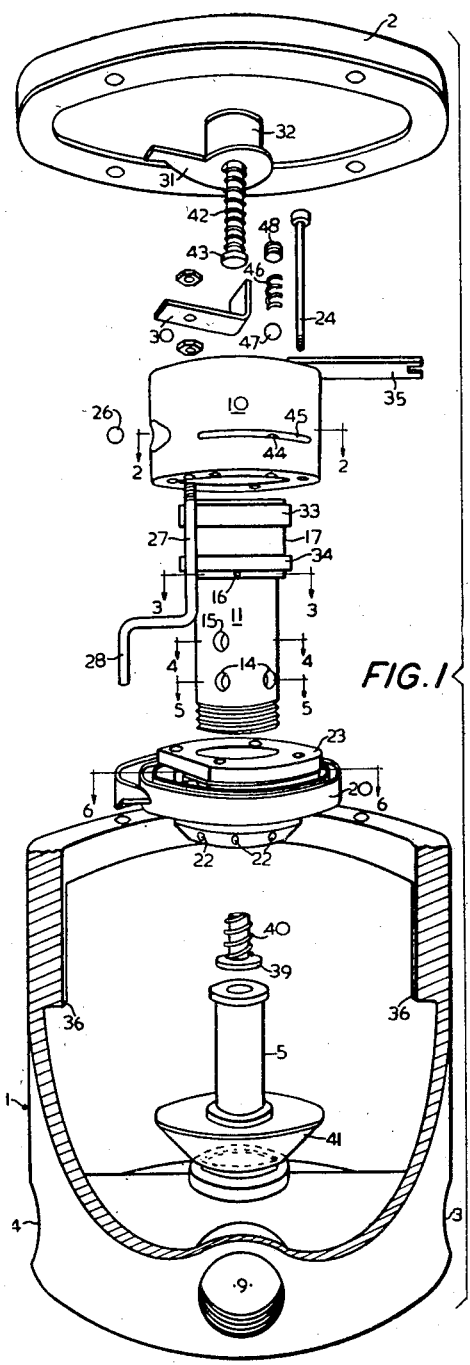
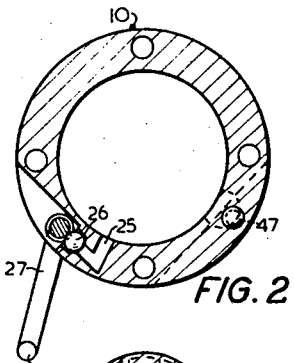
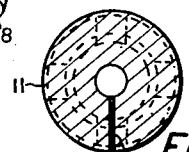
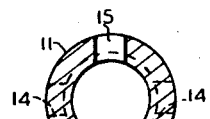
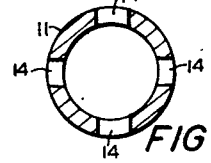
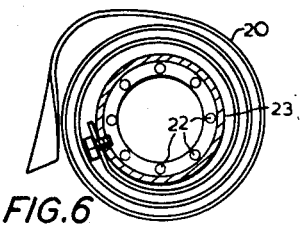

Dec. 18, 1956  W. J. A'BECKETT  2,774,538
APPARATUS FOR MIXING LIQUIDS OF DIFFERENT TEMPERATURES
Filed Sept. 9. 1955  2 Sheets-Sheet 2

United States Patent Office 2,774,538
Patented Dec. 18, 1956

2,774,538
APPARATUS FOR MIXING LIQUIDS OF DIFFERENT TEMPERATURES

William John a'Beckett, Mona Vale, New South Wales, Australia

Application September 9, 1955, Serial No. 533,455

Claims priority, application Australia September 10, 1954

7 Claims. (Cl. 236—12)

This invention relates to apparatus for mixing liquids of different temperatures to provide a constant temperature effluent having any desired temperature between that of the colder influent and that of the hotter influent.

According to the present invention there is provided an apparatus comprising a housing incorporating a mixing chamber and having inlet ports for liquids of different temperatures and an outlet port for the mixed effluent, a hydraulically actuated valve means adapted to vary the input of the liquid of lower temperature (hereinafter referred to as cold liquid) and a thermally responsive means disposed in said mixing chamber, the said thermally responsive means being adapted to actuate a valve which varies the pressure of liquid to which the said hydraulically actuated valve means is responsive as the temperature in the mixing chamber falls below or rises above a predetermined setting so that the hydraulically actuated valve reduces or increases, respectively, the input of the cold liquid.

Preferably means are provided to vary the input of the liquid of higher temperature (hereinafter referred to as hot liquid) so that as the input of the cold liquid is reduced or increased the input of the hot liquid is increased or reduced, respectively.

An external means may be provided for manually varying the response of the thermally responsive means in order to set the apparatus to deliver any desired temperature of effluent. The external means of setting may also incorporate a visual indicator of the temperature setting.

The invention will be more fully understood by reference to the following description wherein an exemplary embodiment is represented.

In the accompanying drawings:

Fig. 1 is an exploded elevation in perspective of one type of device in accordance with the invention with portion of its casing cut away to reveal the interior;

Fig. 2 is a plan view to an enlarged scale and in section on the line 2—2 in Fig. 1, only the component concerned being shown;

Fig. 3 is a similar view in section on the line 3—3 in Fig. 1;

Fig. 4 is a similar view in section on the line 4—4 in Fig. 1;

Fig. 5 is a similar view in section on the line 5—5 in Fig. 1;

Fig. 6 is a similar view in section on the line 6—6 in Fig. 1;

Figure 7:
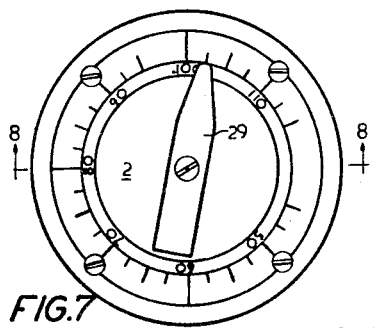
Fig. 7 is a plan view to a reduced scale of the device with its cover in place.
Figure 9:
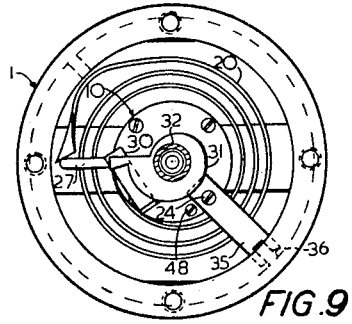
Figure 8:
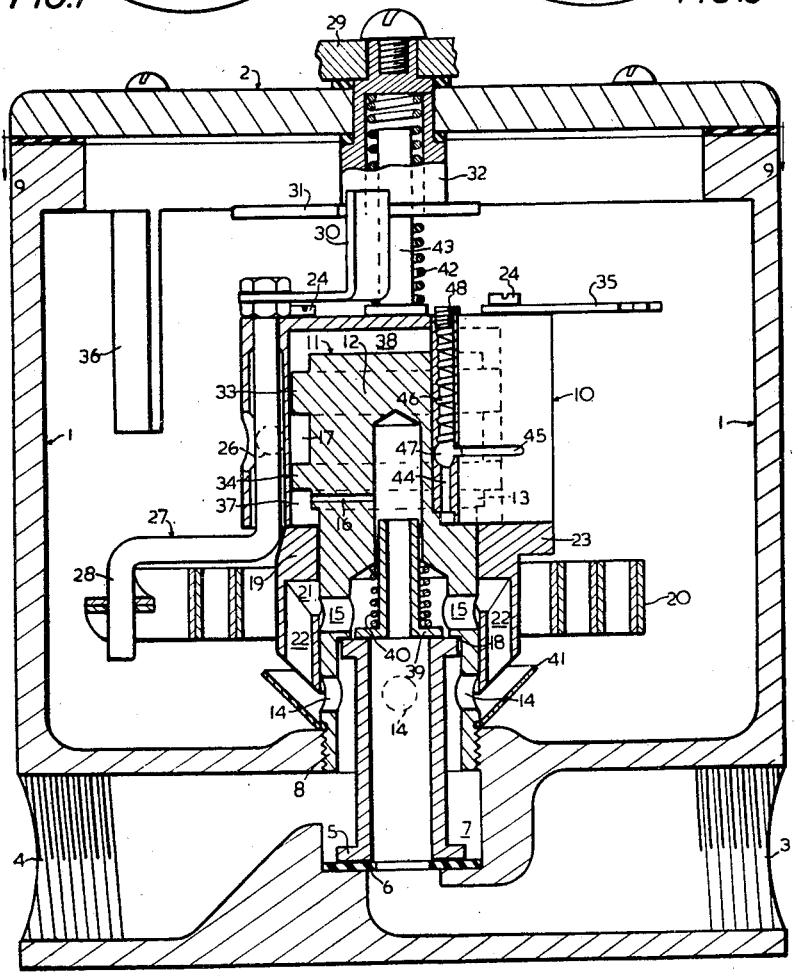

Fig. 8 is an elevation drawn to an enlarged scale, substantially in section on the line 8—8 in Fig. 7 with the exception that an extra sectoral portion of the sleeve 10 has been included to show a longitudinal passage and ball valve therein; and Fig. 9 is a plan view in section on the line 9—9 in Fig. 8.

In the construction illustrated in the drawings there is provided a cylindrical housing 1 closed at one end and provided with a cover plate 2 at the other end the space defined by the housing and cover plate constituting a mixing chamber.

In the outside periphery of the housing a pair of diametrically opposed ports 3 and 4 are provided adjacent the closed end thereof. The port 3 is provided with a connection for the supply of cold liquid and the inwardly disposed bore of this port registers with an internally positioned medially disposed tubular member 5 which is flanged at each end and one end of which abuts against a recess 6 provided in the closed end of the housing so as to allow an unrestricted flow of cold liquid through the bore of the tubular member. The other port 4 is provided with a connection for the supply of hot liquid and registers in a similar unrestricted manner with an annular channel 7 formed by the inside diameter of a medially disposed port provided in the housing and the outside diameter of the tubular member. The bore of the medially disposed port is threaded at 8 to receive the threaded end of the shank of the valve stem of the valve mechanism hereinafter described. An outlet port 9 for mixed effluent is provided at any suitable position in the housing.

The valve mechanism is constituted by a first cylindrical sleeve 10 which is closed at one end and through the wall of which a single passageway 25 is provided. The sleeve 10 is slidably disposed over a stationary valve stem 11 having an enlarged head 12 with sufficient clearance to allow a small quantity of the liquid to pass between the head of the piston and the inner wall of the sleeve.

The outer wall of the thick walled shank of the valve stem is threaded at its end and is stepped as shown at 13 to provide a larger outer diameter adjacent to the enlarged head. The shank of the valve stem is provided with two rows of radial liquid outlet ports 14 and 15 between the threaded end and the step. A fine drilling 16 is provided through the stepped portion of the shank communicating with the bore of the shank. The enlarged head of the valve stem is provided with an annular groove 17 thus leaving flanges 33 and 34.

The bore of the shank of the valve stem is stepped as shown at 18 to provide a larger diameter from a position between the two rows of valve ports to the threaded end.

A second cylindrical sleeve 19 open at both ends and to which one end of a coaxial spirally wound bimetallic strip 20 is rigidly connected is slidably disposed over the shank of the valve stem.

The inner wall of this sleeve is provided with an annular channel 21 communicating with a plurality of ports 22 provided longitudinally in the wall of the sleeve. The second sleeve 19 is provided with a flange 23 which is bolted by bolts 24 to the first sleeve 10 so that the open end of the first sleeve abuts in liquid tight manner against the flange on the second sleeve.

The said passageway 25 provided through the wall of the first cylindrical sleeve provides a controlled communication for liquid between the annular groove 17 in the enlarged head of the valve stem and the mixing chamber, the control comprising a ball valve 26 selectively seating on the outer end of the passageway by means of a control rod 27 pressing on the ball when the control rod is actuated by contraction of the bimetallic strip 20 with which the crank end 28 of the control rod coacts. Control rod 27 is a loose fit in the wall of sleeve 10 and, being rigidly fixed at one end to lever arm 30, is prevented from rotational movement within the wall of the sleeve. Thus, by contraction of the bimetallic strip 20, the end of the bimetallic strip pushes upon the crank end 28 of the control rod 27, angularly displacing the same, which forces valve 26 on its seating in the end of passageway 25.

The rod which actuates the ball valve 26 may be adjusted to open and close the valve at any predetermined setting by rotation of lever arm 29 which is attached to a shaft 32 which is coaxial with and passes through the cover plate 2 forming the enclosure of the housing, said rotation transmitting movement to lever arm 30 via lever arm 31 which is rigidly affixed to the free end of the shaft 32, lever arm 30 being rigidly affixed to that end of the rod 27 which is remote from crank 28. The end of lever arm 29 forms a pointer for traversing a calibrated dial.

The threaded end of the valve stem shank is screwed into rigid connection in the threaded bore of the medially disposed port in the housing until the step in the bore of the shank contacts the free flanged end of the tubular member in liquid-tight manner so that the cold liquid which flows through the bore of the tubular member, as above described, cannot communicate with the radial liquid outlet ports 14 nearest the threaded end of the shank of the valve stem (hereafter termed hot liquid outlet ports) whilst the hot liquid similarly cannot communicate with the second row of radial ports 15 (hereafter termed cold liquid outlet ports).

The arrangement is such that, the valve stem being fixed in position, the two sleeves are free to slide over same. They are held in non rotatable position by an arm 35 one end of which is rigidly connected to one of the sleeves and the other end of which is bifurcated and forms a yoke slidably engaging a longitudinal guide rail 36 on the inner wall of the housing.

With the enlarged head in close proximity to the closed end of the first cylindrical sleeve the hot liquid outlet ports 14 are completely closed by the second cylindrical sleeve whilst the cold liquid outlet ports 15 are open, being positioned at the annular channel 21 of the second sleeve, and allow cold liquid to flow into the mixing chamber. As the sleeves are slid over the valve stem away from the threaded end the previously closed ports are gradually opened as they emerge from that end of the second sleeve removed from the flange and allow hot liquid to flow into the mixing chamber whilst the previously open ports are gradually closed by the second sleeve. This movement of the sleeves may continue until the flanged end of the second sleeve contacts the step 13 on the shank of the valve stem, at which point the hot liquid outlet ports 14 will be fully open and the others fully closed by the second sleeve.

It may now be seen that when the apparatus is connected to sources of hot and cold liquid supply cold liquid will flow into the mixing chamber through the cold liquid outlet ports 15 and will also flow into the bore of the valve stem. Cold liquid will also flow into the annular space 37 between the shank end of the enlarged head of the valve stem and that end of the second sleeve which abuts with the first sleeve via the fine drilling 16 in the shank and into the groove 17 formed in the enlarged head of the valve stem and thence into the space 38 between the head of the valve stem and the closed end of the first cylindrical sleeve. The thermally actuated ball valve 26 will be in a closed position when the liquid is below desired temperature.

It is apparent that the area of the closed end of the first cylindrical sleeve being greater than that area of the end of the second sleeve within annular space 37 a pressure differential will cause the sleeves to move over the valve stem away from the threaded end thus reducing the flow of cold liquid into the mixing chamber and at the same time admitting and then increasing the flow of hot liquid. The temperature of mixed liquid will rise causing gradual opening of the thermally actuated valve whereupon the pressure differential referred to above is reduced by the leakage of liquid from the groove in the head of the valve stem past the thermally actuated valve into the mixing chamber and therefore the sleeves move back towards the closed end of the housing thus reducing the inflow of hot liquid and increasing the inflow of cold liquid. A condition of equilibrium is soon reached.

For the most efficient operation of this device it is desirable that the change in direction of travel of the slidable sleeves should occur as rapidly as possible with changes in temperature of the liquid entering the mixing chamber. To this end a conical ring 41 may be provided, surrounding the shank of the valve stem to divert the liquid entering the mixing chamber from both the hot and cold liquid outlet ports 14 and 15 directly onto the bimetallic strip.

On the other hand it has been found that the speed of movement of the sleeves should be retarded to prevent large fluctuations in the temperature of the mixed effluent.

It will be apparent from the previous description of the enlarged head of the valve stem that the small clearance for the passage of liquid between the flange 34 adjacent the shank and the inner wall of the first cylindrical sleeve regulates the pressure differential hereinbefore referred to. The purpose of the other flange 33 is to restrict the flow of liquid between the space provided by the groove and the space between the head of the valve stem and the closed end of the first cylindrical sleeve, which restriction retards the action of the valve mechanism i. e. acts as a damper to obviate large fluctuations in the temperature of the mixed effluent and to ensure a constant temperature effluent.

To further obviate undesirably large fluctuations in the movement of the sleeves and to compensate for errors in machining the clearances between the enlarged head and the first sleeve an adjustable relief valve 47 may be provided to prevent excessive pressure building up within the first sleeve 10. This valve operates in a passage 44 provided longitudinally in the wall of the first sleeve 10, an opening 45 communicating with the mixing chamber being provided to the passage above the valve seating. The valve is urged towards the seating by a coil spring 46 which is adjustably secured in the passage 44 by a screw 48. The open end of the passage communicatees with the annular space 37.

The device requires a cold liquid pressure of about 4–5 lbs. per square inch for operation. For safety in case the pressure of the cold liquid supply should fall below this value the bore of the shank of the valve stem may be narrowed adjacent the enlarged head and a rod 39 with a medially positioned longitudinal drilling slidably positioned in said narrowed bore and held in abutment against the flanged tubular member 5 by a light spring 40 positioned between the rod and the head of the valve stem. By this arrangement cold liquid cannot flow into the mixing chamber but is conveyed directly to the valve mechanism until its pressure is sufficient to overcome the tension of the spring and force the rod towards the head of the valve stem.

As a further safeguard in case the cold liquid supply should fail and the valve mechanism thus become inoperative shaft 32 may be bored to accept a spring 42 and plunger 43, the enlarged end of the plunger abutting with the closed end of the first sleeve 10 and thereby urging the sleeve assembly towards the closed end of the housing. The tension of the spring is such as to move the sleeves sufficiently to close off the hot liquid outlet ports 14 when there is insufficient cold liquid to operate the valve mechanism.

Many variations and modifications may be made in the arrangement and construction of the various parts without departing from the spirit and scope of the invention.

I claim:

1. An apparatus for mixing liquids of different temperatures to provide a constant temperature effluent, said apparatus comprising a housing incorporating a mixing chamber and having inlet ports for liquids of different temperatures and an outlet port for the mixed effluent, a hydraulically actuated valve means adapted to vary the input of the cold liquid, a thermally responsive means disposed in said mixing chamber, said hydraulically actuated valve means comprising a stationary valve stem having an enlarged head and a shank with a shouldered portion, restricted radial passages in the shouldered portion of the shank, the shank being provided with internal passageways communicating with hot and cold liquid outlet ports disposed in spaced relationship longitudinally in the wall of the shank, said shank being rigidly affixed in the housing so that the passageways of the shank are respectively in communication with the hot and cold inlet ports of the housing and provided with a passageway connecting the cold inlet of the housing with at least one restricted radial passage in the shouldered portion of the shank at the junction of said shank with the enlarged head of the valve stem, a first cylindrical sleeve closed at one end and slidably and non-rotatably disposed over the enlarged head of the valve stem, and a second cylindrical sleeve slidably and non-rotatably disposed on said shank of said valve stem one end of which abuts with and is secured in liquid tight manner to the open end of said first cylindrical sleeve, said second sleeve being adapted to vary the opening of the outlet ports in the wall of the shank and also adapted to permit the flow of liquid from the outlet ports into the mixing chamber, the free end of said enlarged head and the closed end of the first sleeve defining a cylindrical space, the shank end of the enlarged head of the valve stem and that end of the second sleeve which abuts with the first sleeve defining an annular space, said sleeves being slidably displaceable by a liquid pressure differential generated between the annular space and the cylindrical space, said pressure differential being generated by the bleeding of liquid from said restricted radial passages in the shank past said enlarged head into said cylindrical space, and a valve which varies the pressure of liquid to which the said hydraulically actuated valve is responsive as the temperature in the mixing chamber falls below or rises above a predetermined setting so that the hydraulically actuated valve reduces or increases, respectively, the input of the cold liquid, said thermally responsive means being adapted to actuate said valve.

2. An apparatus as claimed in claim 1, in which the valve which varies the pressure of liquid to which the hydraulically actuated valve means is responsive is seated in a passage communicating between the mixing chamber and an annular groove in the enlarged head of the valve stem.

3. An apparatus as claimed in claim 2, in which said thermally responsive means is a bimetallic spiral.

4. An apparatus as claimed in claim 3, in which a pressure relief valve is provided in a passageway in said first cylindrical sleeve, said valve being adapted upon excess pressure building up within the first cylindrical sleeve to permit a by-pass of the cold liquid from said annular space into the mixing chamber.

5. An apparatus for mixing liquids of different temperatures to provide a constant temperature effluent comprising a housing incorporating a mixing chamber, a pair of diametrically opposed ports provided in the outside periphery of the housing adjacent closed end thereof, one of said ports having a connection for the supply of cold liquid and its inwardly disposed bore registering with an internally positioned medially disposed tubular member which is flanged at each end and one end of which abuts with a recess provided in the closed end of the housing so as to allow an unrestricted flow of cold liquid through the bore of the tubular member, the other of said ports having a connection for the supply of hot liquid and registering with an annular channel formed by the inside diameter of a medially disposed port provided in the housing and the outside diameter of the tubular member, a hydraulic valve means comprising a stationary valve stem having an enlarged head and a shank, the shank being hollow and provided with two rows of radial liquid outlet ports, the inside diameter of the shank being stepped to provide a larger diameter from a position between the two rows of liquid outlet ports to the end which is affixed in the said medially disposed port provided in the housing so that the said step abuts in liquid tight manner with the free flanged end of the tubular member, a first cylindrical sleeve closed at one end and slidably and non-rotatably disposed over the enlarged head of the valve stem, and a second cylindrical sleeve slidably and non-rotatably disposed on said shank of said valve stem, one end of which abuts with and is secured in liquid tight manner to the open end of said first cylindrical sleeve, said second sleeve being adapted to vary the opening of the outlet ports in the wall of the shank and also adapted to permit the flow of liquid from the outlet ports into the mixing chamber, the said sleeves being slidably displaceable by a liquid pressure differential generated between an annular space between the shank end of the enlarged head of the valve stem and that end of the second sleeve which abuts with the first sleeve and a cylindrical space between the free end of said enlarged head and the closed end of the first sleeve, said pressure differential being generated by bleeding of liquid from said restricted radial passage in the shank past said enlarged head into said cylindrical space, and a thermally responsive means disposed in said mixing chamber, the said thermally responsive means being adapted to actuate a valve which varies the pressure of liquid to which the said hydraulically actuated valve is responsive as the temperature in the mixing chamber falls below or rises above a predetermined setting so that the hydraulically actuated valve reduces or increases, respectively, the input of the cold liquid, and at the same time increases or reduces, respectively, the input of the hot liquid.

6. An apparatus as claimed in claim 5, in which spring loaded means to prevent flow of cold liquid to the liquid outlet ports when the pressure of cold liquid is below that necessary to produce sliding movement of the sleeves are provided in the hollow shank of the valve stem.

7. An apparatus as claimed in claim 6, including a spring loaded plunger, one end of which abuts with the closed end of the said first cylindrical sleeve, said plunger being adapted to move the first and second sleeve assembly and close off the hot liquid outlet ports in the shank of the valve stem when there is insufficient cold liquid pressure to operate the hydraulic valve means.

References Cited in the file of this patent
UNITED STATES PATENTS

| | | |
|---|---|---|
| 1,901,268 | Snediker | Mar. 14, 1933 |
| 1,939,970 | Fuess et al. | Dec. 19, 1933 |
| 2,316,075 | King | Apr. 6, 1943 |